(12) United States Patent
Roske et al.

(10) Patent No.: US 11,383,775 B2
(45) Date of Patent: Jul. 12, 2022

(54) TRACK ASSEMBLY FOR POWER MACHINE

(71) Applicant: Clark Equipment Company, West Fargo, ND (US)

(72) Inventors: Craig R. Roske, Lincoln, ND (US); Scott J. LaCoe, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 0 days.

(21) Appl. No.: 17/029,378

(22) Filed: Sep. 23, 2020

(65) Prior Publication Data

US 2021/0001935 A1 Jan. 7, 2021

Related U.S. Application Data

(62) Division of application No. 15/747,577, filed as application No. PCT/US2016/049676 on Aug. 31, 2016, now Pat. No. 10,793,210.

(Continued)

(51) Int. Cl.
*B62D 55/14* (2006.01)
*B62D 51/00* (2006.01)
(Continued)

(52) U.S. Cl.
CPC ........... *B62D 55/14* (2013.01); *B62D 51/007* (2013.01); *B62D 55/06* (2013.01); *B62D 51/02* (2013.01);
(Continued)

(58) Field of Classification Search
CPC ................................ B62D 55/14; B62D 55/10
See application file for complete search history.

(56) References Cited

U.S. PATENT DOCUMENTS 1,431,375 A * 10/1922 Dalrymple ............. B62D 55/10
305/40
1,953,051 A * 3/1934 Linn ...................... B62D 55/02
280/28.5
(Continued)

FOREIGN PATENT DOCUMENTS

CN 203439160 U 2/2014
CN 204507052 U 7/2015
(Continued)

OTHER PUBLICATIONS

International Search Report and Written Opinion dated Dec. 2, 2016 for International Application No. PCT/US2016/049676 filed Aug. 31, 2016, 15 pages.

(Continued)

*Primary Examiner* — Kevin Hurley
(74) *Attorney, Agent, or Firm* — John Veldhuis-Kroeze; Westman, Champlin & Koehler, P.A.

(57) ABSTRACT

Track assemblies (242; 300) for power machines (100; 200) include a track frame (243; 302), including a primary portion (304) and a second portion (306) moveable with respect to the primary portion. A plurality of rollers (248; 316) are positioned along the primary portion of the track frame relative to each other and the center of gravity of the power machine to provide an improved capability to compensate for vibration generated as the power machine moves over a support surface. In some aspects, a portion of a tensioning idler (e.g., 310) is positioned within a cylinder defined by one of the plurality of rollers.

10 Claims, 6 Drawing Sheets

Related U.S. Application Data

(60) Provisional application No. 62/212,290, filed on Aug. 31, 2015.

(51) Int. Cl.
  | | |
  |---|---|
  | *B62D 55/06* | (2006.01) |
  | *E02F 9/02* | (2006.01) |
  | *B62D 51/02* | (2006.01) |
  | *B62D 51/04* | (2006.01) |
  | *B62D 55/30* | (2006.01) |
  | *B62D 55/10* | (2006.01) |
  | *E02F 9/16* | (2006.01) |

(52) U.S. Cl.
  CPC .............. *B62D 51/04* (2013.01); *B62D 55/10* (2013.01); *B62D 55/30* (2013.01); *B62D 55/305* (2013.01); *E02F 9/02* (2013.01); *E02F 9/16* (2013.01)

(56) References Cited

U.S. PATENT DOCUMENTS

| | | | | |
|---|---|---|---|---|
| 2,049,643 | A | * | 8/1936 | Eberhard ........... B62D 55/0842 180/9.6 |
| 2,206,966 | A | * | 7/1940 | Law ....................... B62D 55/20 305/122 |
| 2,238,347 | A | * | 4/1941 | Starr ...................... B62D 55/12 474/165 |
| 2015/0068823 | A1 | | 3/2015 | Knutson |

FOREIGN PATENT DOCUMENTS

| | | |
|---|---|---|
| JP | S54-51741 U | 4/1979 |
| JP | S63-180482 U | 11/1988 |
| JP | H01-72480 U | 5/1989 |
| JP | H04-321478 A | 11/1992 |
| WO | WO-2014056089 A1 * | 4/2014 ............. B62D 55/10 |
| WO | WO-2021146816 A1 * | 7/2021 ........... B62D 55/244 |

OTHER PUBLICATIONS

Chinese Office Action and English translation dated Dec. 18, 2019 for Chinese Application No. 201680049413.6, 16 pages.

U.S. Patent Office issued prosecution for U.S. Appl. No. 15/747,577, filed Jan. 25, 2018, including: Notice of Allowance and Fees Due (PTOL-85) dated Jun. 1, 2020, 7 pages; Non-Final Rejection dated Jan. 28, 2020, 8 pages; Restriction Requirement dated Nov. 13, 2019, 6 pages; 21 pages total.

* cited by examiner

TRACK ASSEMBLY FOR POWER MACHINE

CROSS-REFERENCE TO RELATED APPLICATION

This is a divisional of U.S. application Ser. No. 15/747,577, filed on Jan. 25, 2018, which published as US 2018-0215425 A1 on Aug. 2, 2018, which is scheduled to issue as a U.S. Pat. No. 10,793,210 on Oct. 6, 2020, which is a Section 371 National Stage Application of International Application No. PCT/US2016/049676, internationally filed on Aug. 31, 2016 and published as WO 2017/040643 A1 on Mar. 9, 2017, in English; which claims priority to U.S. Provisional Patent Application No. 62/212,290, filed on Aug. 31, 2015, the contents of which are hereby incorporated by reference in their entireties.

FIELD

Disclosed embodiments relate to power machines and more particularly to power machines that have endless tracks for tractive elements.

BACKGROUND

Some power machines, such as mini-loaders or other loaders have tracks mounted on either side of a frame. Endless tracks are powered about track frames on which the tracks are carried. One or more idlers are typically employed to maintain a desirable tension on the endless tracks. In addition, a plurality of rollers or bogie wheels are typically attached to the track frames and engage the endless tracks under the track frames to distribute the weight of the machine over that portion of the track that is in engagement with the ground.

The discussion above is merely provided for general background information and is not intended to be used as an aid in determining the scope of the claimed subject matter.

SUMMARY

Disclosed embodiments include track assemblies for attachment to a power machine. Each track assembly includes a track frame, at least one idler, a sprocket, and a plurality of rollers over which an endless track is carried. The plurality of rollers is spaced along the bottom of the track frame to optimize the power machine's ride.

In one illustrative embodiment, a power machine is disclosed. The power machine has frame, an engine supported by the frame, a transmission powered by the engine, and a track assembly coupled to the frame and to an output of the transmission. The track assembly includes a track frame with a primary portion and a secondary portion that is moveable with respect the first portion under the influence of a tensioning member. A track is carried on the track frame and is moveable about the frame to move the power machine over a support surface. A first idler pivotally mounted to the primary portion of the frame and positioned against track. A second idler is pivotally mounted to the secondary portion of the frame and positioned against the track. Each of the first and second idlers is positioned to engage the track to provide tension to the track. A plurality of rollers is pivotally mounted on a bottom side of the track frame. Each of the rollers is positioned to engage the track. Movement of the secondary portion of track frame adjusts the tension applied against the track. When the secondary portion of the track frame is fully extended, a perimeter of the second idler intersects a cylinder defined by a perimeter of one of the plurality of the rollers.

In another illustrative embodiment a track assembly for a power machine, is disclosed. The track assembly includes a track frame having a main portion and a secondary portion that is moveable with respect to a first portion. A track is carried on the track frame and capable of being driven around the frame. A first idler is rotatably mounted to the main portion of the track frame and positioned to engage the track and rotate as the track is driven about the first idler. A second idler rotatably mounted to the secondary portion track portion and positioned to engage the track and rotate as the track is driven about the second idler. A plurality of rollers is rotatably mounted to the main portion of the track frame. A first of the plurality of the rollers is positioned close enough to the second idler so that the second idler extends into a cylinder defined by a perimeter of the first roller.

In yet another embodiment, a power machine is disclosed. The power machine has a frame, a lift arm coupled to the frame, an engine, and a drive system powered by the engine and coupled to a track assembly for driving the power machine across a support surface. The track assembly includes a track frame, and a track carried by the track frame and driven under power about the track frame. The track has a plurality of reinforcement members extending transversely to a direction of travel of the power machine. The reinforcement members are evenly spaced from each other so that the track has an alternating pattern of reinforced sections separated by unreinforced sections. First, second, third and fourth rollers are rotatably mounted to the track frame and positioned to engage the track along a bottom side of the track frame. When the second roller is positioned above a first reinforced section of the track, the third roller is positioned above a second reinforced section of the track.

This Summary and the Abstract are provided to introduce a selection of concepts in a simplified form that are further described below in the Detailed Description. This Summary is not intended to identify key features or essential features of the claimed subject matter.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Disclosed embodiments provide track assemblies and power machines with track assemblies with track frames about which an endless track is carried and powered. A plurality of rollers are pivotally attached to a bottom of each track frame. The rollers are positioned to apply and distribute pressure on an endless track that is carried by the track frame. Before discussing specific embodiments of the present disclosure, however, a brief overview of power machines on which the embodiments can be advantageously employed are discussed.

Figure 1:
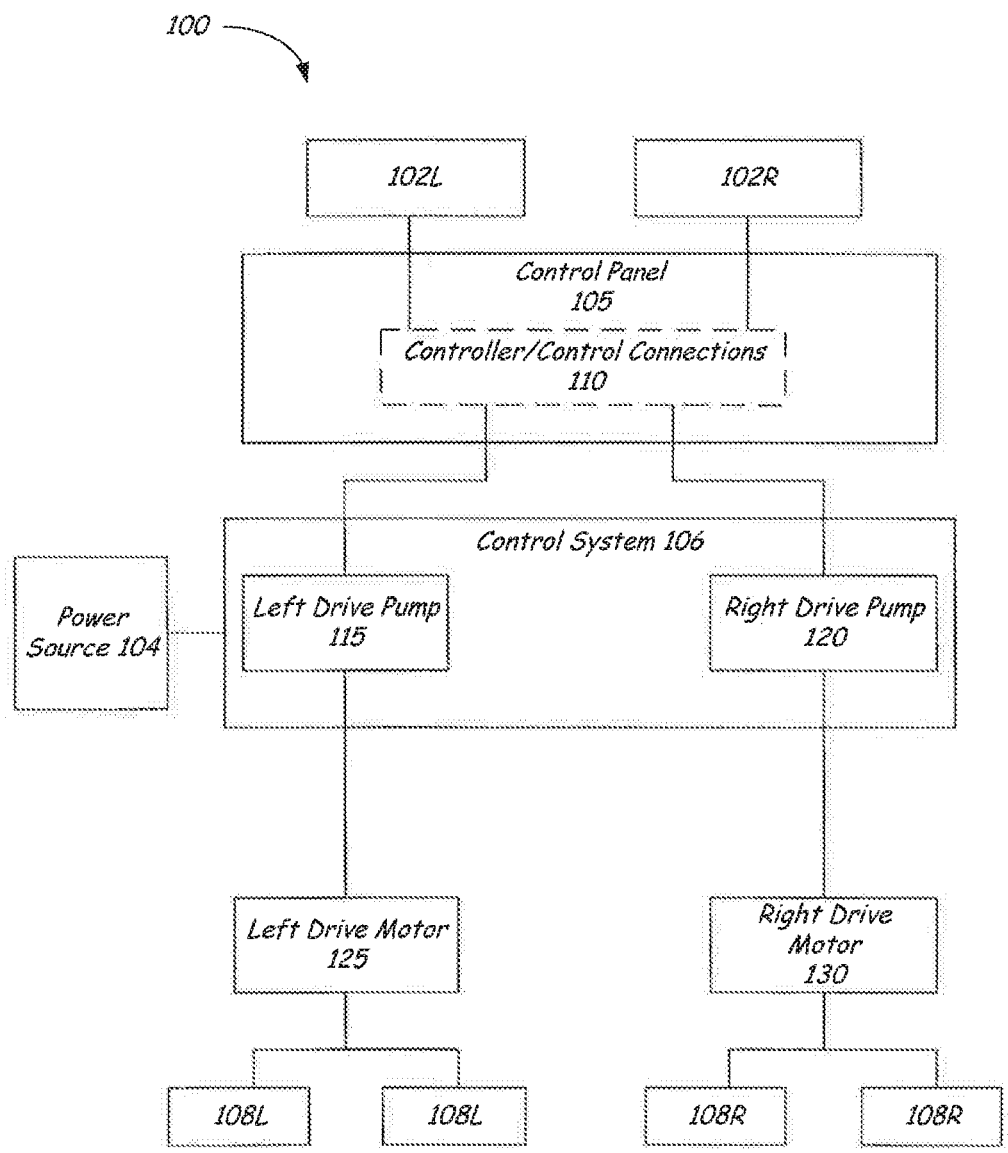
FIG. 1 is a block diagram illustrating portions of a power machine upon which embodiments of the present disclosure may be advantageously practiced.

FIG. 1 is a schematic diagram of portions a power machine 100 upon which the embodiments disclosed below can be advantageously employed. Power machine 100 is representative of a number of different types of power machines including, but not necessarily limited to, mini loaders, where an operator controls the loader from a position that is behind or substantially behind the loader. In some of these types of loaders, an operator can walk behind the loader; in others, the operator can ride on the loader. Power machine 100 includes, in an exemplary embodiment, left and right joystick controllers or joystick input devices 102L and 102R located on a control panel 105, a power source 104, a control system 106 including left drive pump 115 and right drive pump 120, a left drive motor 125 and a right drive motor 130, and left side tractive elements 108L and right side tractive elements 108R.

In some embodiments, power source 104 is an internal combustion engine, though other power sources can also be used, such as those using electricity or other sources of energy. Control system 106 is operably coupled to the power source 104, receives power from the power source 104, and converts the received power to signals that operate functional components of the power machine. In some embodiments, the control system 106 includes hydraulic components such as one or more hydraulic pumps (e.g., left and right drive pumps 115 and 120) that are configured to provide pressurized hydraulic fluid to various motors, actuators, and valve components that are illustratively employed to control the flow of hydraulic fluid to some or all of the motors and actuators used to control functional components of the power machine 100. Other types of control systems are contemplated. For example, the control system 106 can include electric generators or the like to generate electrical control signals to power electric actuators. For the sake of simplicity, the motors and actuators disclosed herein are referred to as hydraulic or electrohydraulic motors and actuators, but other types of motors and actuators can be employed in some embodiments.

Left and right joystick operator inputs 102L and 102R located on a control panel 105 are operatively coupled to control connections 110 to provide inputs or input signals, indicative of the actuation of the inputs by an operator, to the control system 106 to control left and right drive pumps 115 and 120. Control connections can include electrical, mechanical or other connections, a controller, or other devices. Left and right drive pumps 115 and 120 are illustratively variable displacement pumps that are in hydraulic communication with left drive motor 125 and right drive motor 130, respectively. Control connections 110 illustratively provide output signals to control the left and right drive pumps 115 and 120 to provide hydraulic fluid to the left and right drive motors 125 and 130 to cause the left and right drive motors to rotate in a clockwise or counterclockwise direction at a rate determined by the drive control operator inputs 102L and 102R. Left drive motor 125 is coupled to tractive elements 108L and right drive motor 130 is coupled to tractive elements 108R. Tractive elements 108L and 108R can be track assemblies with one or more such track assemblies on each side of the machine. The left and right drive pumps 115 and 120 can be energized to cause the tractive elements 108L and 108R to act against each other by operating at different speeds and/or directions to accomplish steering by skidding.

Figure 2:
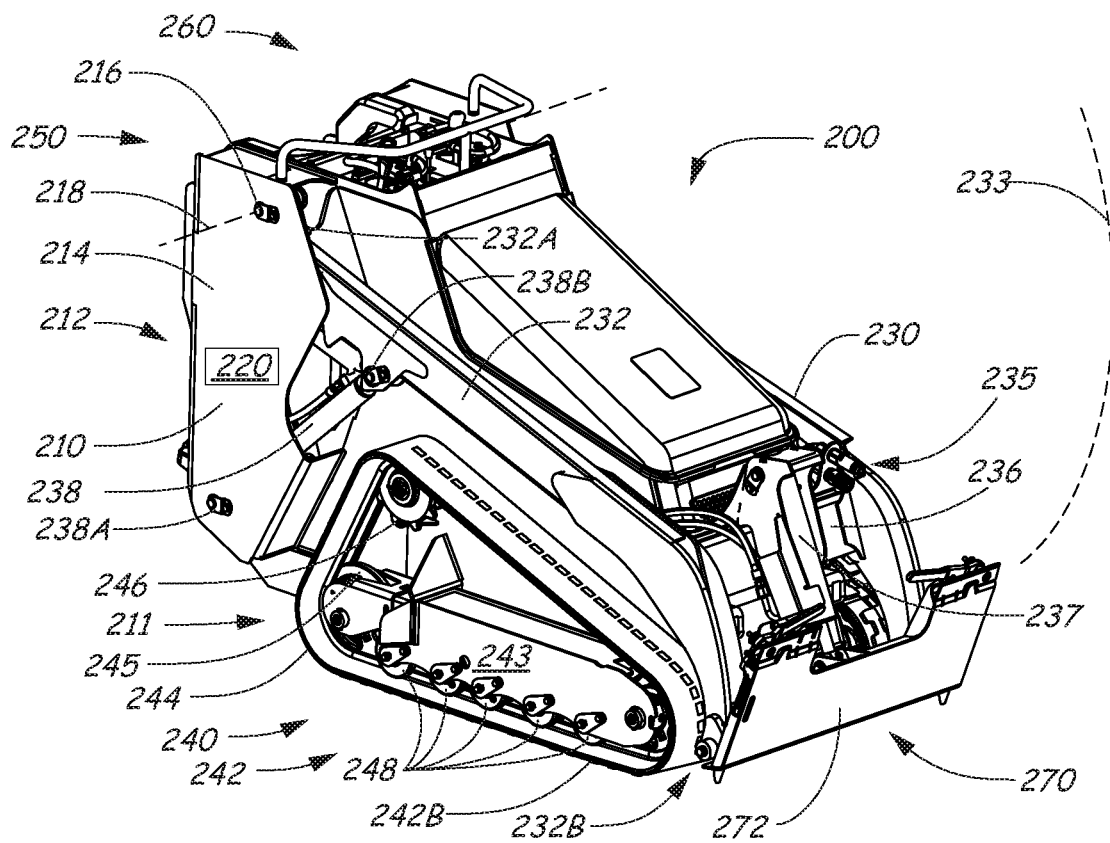
FIGS. 2-3 are perspective illustrations of a power machine upon which the embodiments of the present disclosure can be advantageously practiced.
Figure 3:
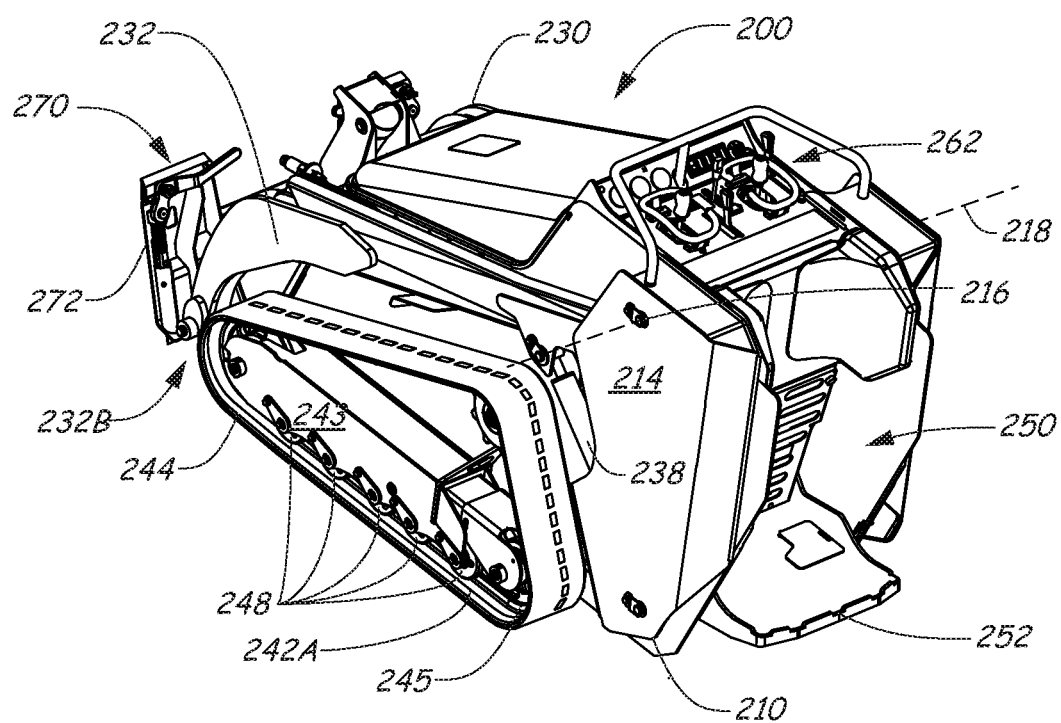

FIGS. 2-3 illustrates a loader 200, which is one particular example of a power machine of the type illustrated in FIG. 1 where the embodiments discussed below can be advantageously employed. Loader 200 is a tracked loader and more particularly, a mini-loader. A mini-loader for the purposes of this discussion is a small loader without an operator cab that can be operated from an operator station at the back of the loader. Some mini-loaders have a platform on which an operator can ride on. Other mini-loaders can be operated by an operator who walks behind the loader. Still other mini-loaders have a platform that is moveable or removable to allow an operator to alternatively ride on the platform or walk behind the loader.

Track loader 200 is one particular example of the power machine 100 illustrated broadly in FIG. 1 and discussed above. To that end, features of loader 200 described below include reference numbers that are generally similar to those used in FIG. 1. For example, loader 200 is described below as having a frame 210, just as power machine 100 has a frame 110. Track loader 200 is described herein to provide a reference for understanding one environment on which the embodiments described below related to operator controls may be practiced. The loader 200 should not be considered limiting especially as to features that loader 200 may have described herein that are not essential to the disclosed embodiments. Such features may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

As mentioned above, loader 200 includes frame 210. Frame 210 supports a power system 220, the power system being capable of generating or otherwise providing power for operating various functions on the power machine. Frame 210 also supports a work element in the form of a lift arm structure 230 that is selectively powered by the power system 220 in response to signals from an operator control system 260 and is capable of performing various work tasks. As loader 200 is a work vehicle, frame 210 also supports a traction system 240, which is also selectively powered by power system 220 in response to signals from operator control system 260. The traction system 240 is capable of propelling the power machine over a support surface. The lift arm structure 230 in turn supports an implement carrier 272, which is capable of receiving and securing various implements to the loader 200 for performing various work tasks. The loader 200 can be operated from an operator station 250 from which an operator can manipulate various control devices to cause the power machine to perform various functions, discussed in more detail below. Frame 210 also supports a work element in the form of a lift arm structure 230 that is powered by the power system 220 and is capable of performing various work tasks.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200 is attached to the undercarriage 211 such as with fasteners or by welding the undercarriage to the mainframe. Mainframe 212 includes a pair of upright portions 214 located on either side and toward the rear of the mainframe that support a lift arm structure 230 and to which the lift arm structure 230 is pivotally attached. The lift arm structure 230 is illustratively pinned to each of the upright portions 214. The combination of mounting features on the upright portions 214 and the lift arm structure 230 and mounting hardware (including pins used to pin the lift arm structure to the mainframe 212) are collectively referred to as joints 216 (one is located on each of the upright portions 214) for the purposes of this discussion. Joints 216 are aligned along an axis 218 so that the lift arm structure is capable of pivoting, as discussed below, with respect to the frame 210 about axis 218. Other power machines may not include upright portions on either side of the frame, or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 242 on either side of the loader 200, which on loader 200 are track assemblies.

The lift arm structure 230 shown in FIGS. 2-3 is one example of many different types of lift arm structures that can be attached to a power machine such as loader 200 or other power machines on which embodiments of the present discussion can be practiced. The lift arm structure 230 has a pair of lift arms 232 that are disposed on opposing sides of the frame 210. A first end 232A of each of the lift arms 232 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure can be raised and lowered) under control of the loader 200 with respect to the frame 210. That movement (i.e. the raising and lowering of the lift arm structure 230) is described by a radial travel path, shown generally by arrow 233. For the purposes of this discussion, the travel path 233 of the lift arm structure 230 is defined by the path of movement of the second end 232B of the lift arm structure.

The lift arms 232 are each coupled to a cross member 236 that provides increased structural stability to the lift arm structure 230. A pair of actuators 238, which on loader 200 are hydraulic cylinders configured to selectively receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 233. The lift arm structure 230 shown in FIGS. 2-3 is representative of one type of lift arm structure that may be coupled to the power machine 200. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has two portions (as opposed to the single piece lift arms 232) that are pivotally coupled to each other along with a control arm to create a four-bar linkage and a substantially vertical travel path or at least more vertical than the radial path of lift arm structure 230. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIGS. 2-3. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the arm 234. The implement interface 270 includes an implement carrier 272 that is capable of accepting and securing a variety of different implements to the lift arm 230. Such implements have a machine interface that is configured to be engaged with the implement carrier 272. The implement carrier 272 is pivotally mounted to the second end 232B of each of the arms 232. An implement carrier actuator 237 is operably coupled the lift arm structure 230 and the implement carrier 272 and are operable to rotate the implement carrier with respect to the lift arm structure. Other examples of power machines can have a plurality of implement carrier actuators. Still other examples of power machines of the type that can advantageously employ the disclosed embodiments discussed herein may not have an implement carrier that is capable of accepting and securing a variety of different attachments, but instead may allow only for implements to be directly attached to its lift arm structure.

The implement interface 270 also includes an implement power source 235 available for connection to an implement on the lift arm structure 230. The implement power source 235 includes pressurized hydraulic fluid ports to which an implement can be coupled. The pressurized hydraulic fluid port selectively provides pressurized hydraulic fluid for powering one or more functions or actuators on an implement. The implement power source can, but need not, include an electrical power source for powering electrical actuators and/or an electronic controller on an implement. The electrical power source can also include electrical conduits that are in communication with a data bus on the loader 200 to allow communication between a controller on an implement and electronic devices on the loader 200. It should be noted that the specific implement power source on loader 200 does not include an electrical power source.

The lower frame 211 supports and has attached to it a pair of tractive elements, identified in FIGS. 2-3 as left track assembly 242A and right track assembly 242B (collectively tractive elements 242). Each of the tractive elements 242 has a track frame 243 that is coupled to the frame 210. The track frame 243 supports and is surrounded by an endless track 244, which rotates under power to propel the loader 200 over a support surface. Various elements are coupled to or otherwise supported by the track frame 243 for engaging and supporting the endless track 244 and cause it to rotate about the track frame. For example, a sprocket 246 is supported by the track frame 243 and engages the endless track 244 to cause the endless track to rotate about the track frame. An idler 245 is held against the track 244 by a tensioner (not shown) to maintain proper tension on the track. The track frame 243 also supports a plurality of rollers 248, which engage the track and, through the track, the support surface to support and distribute the weight of the loader 200.

An operator station 250 is positioned toward the rear of the frame 210. A platform 252 is provided for the operator to stand. While standing on the platform 252, and operator has access to a plurality of operator control inputs 262 that, when manipulated by the operator, can provide control signals to control work functions of the power machine 200, including, for example, the traction system 240 and the lift arm 230.

Display devices 264 are provided in the operator station to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as loader 200, unless otherwise noted or recited, the concepts discussed below are not intended to be limited in their application to the environments specifically described above.

Figure 4:
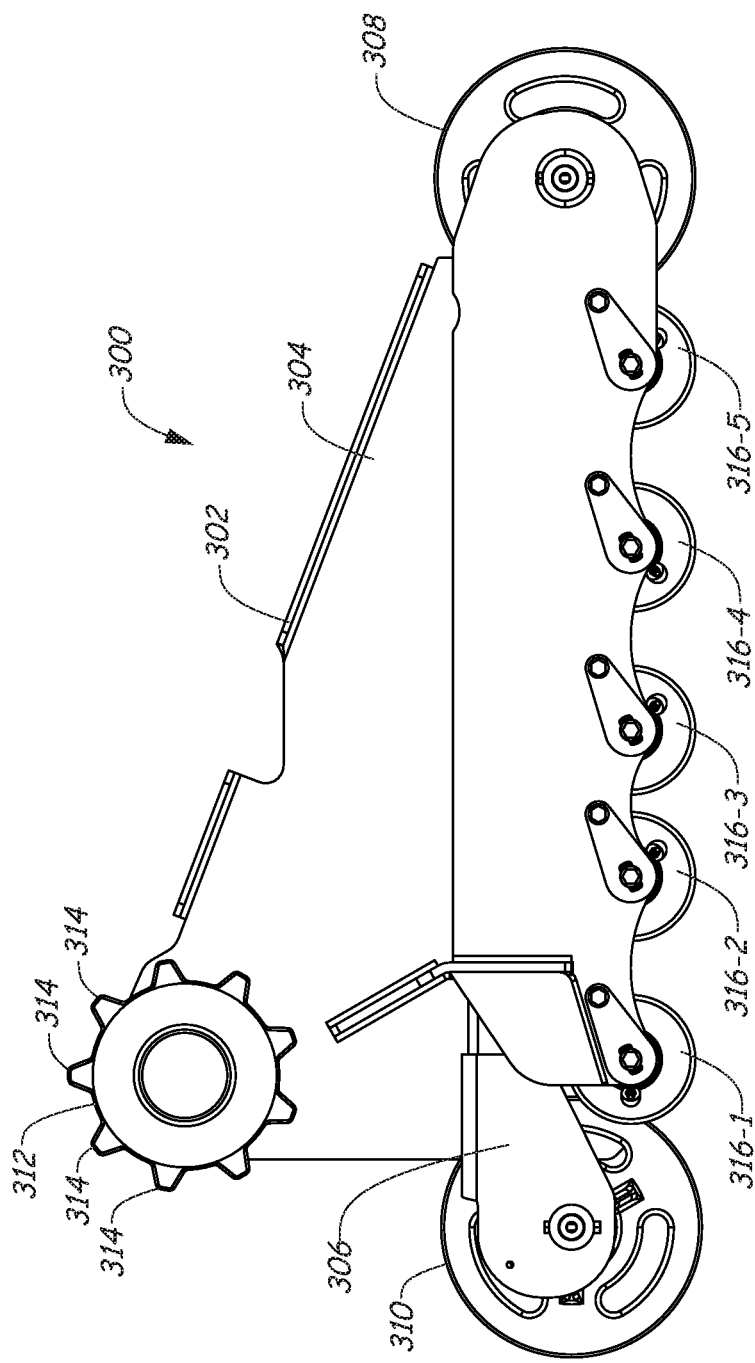
FIG. 4 is a side elevation view of a track frame attachable to a power machine and about which an endless track can be carried, according to one illustrative embodiment.
Figure 5:
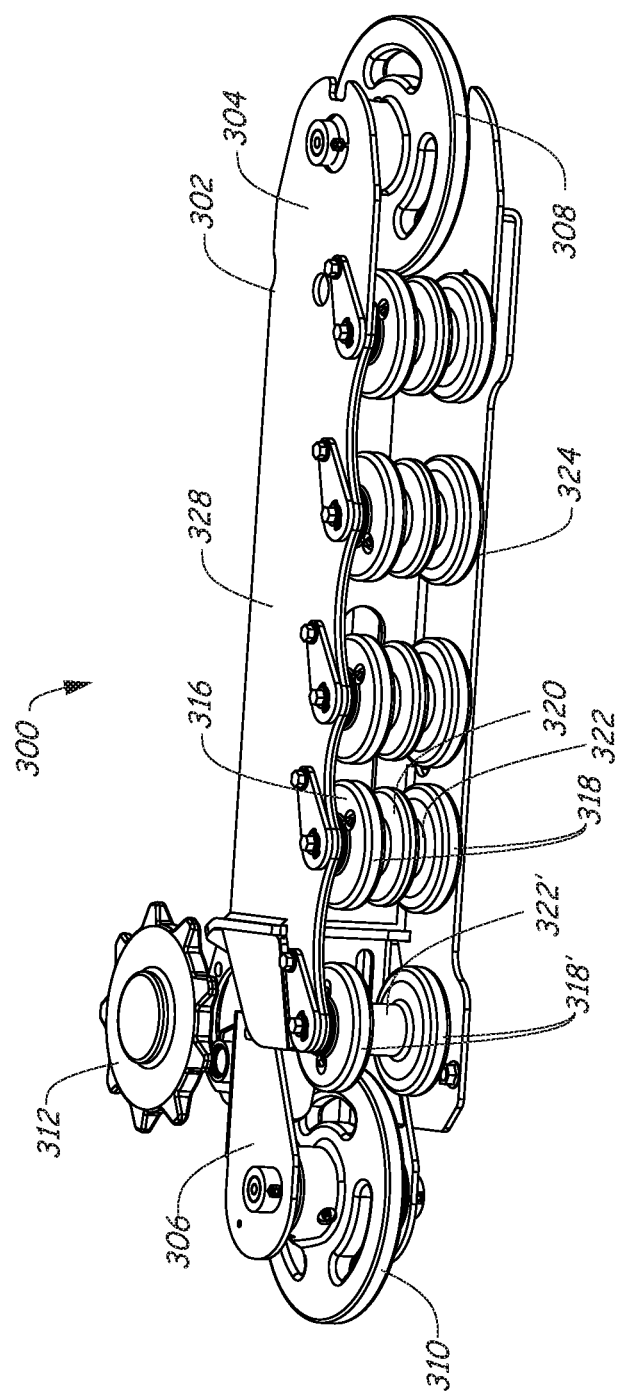
FIG. 5 is a bottom perspective view of the track frame of FIG. 4.

FIGS. 4-5 illustrate a track assembly 300 of the type that can be operably coupled to a power machine such as power machines 100 and 200 according to one illustrative embodiment. Track assembly 300 includes a track frame 302 and an endless track (not shown in the FIGs. to more clearly illustrate the track frame and attached components) that is carried on the frame. The track frame, in one embodiment, is rigidly mounted to the power machine so that it cannot move relative to the rest of the power machine. In other embodiments, the track frame may be mounted to allow for movement between the track frame and the machine frame. The track frame 302 includes a first, or primary, portion 304 and a second portion 306, which is moveable with respect the first portion under the influence of a tensioning member (not shown). The tensioning member can be a spring mechanism, a cylinder, a combination thereof, or any structure suitable for moving the second portion 306 of the track frame 302 relative to the first portion 304. A pair of idlers are mounted, one each, to the first portion 304 (front idler 308) and the second portion 306 (rear idler 310). The front and rear idlers 308, 310 engage the track to apply tension to the track by extending the second portion 306 of the frame relative to the first portion 304. It should be noted that the track assembly 300 is shown in FIGS. 4-5 in an extended or tensioned position. In one embodiment, in order to retract the idler and remove the track, the roller 316-1 will have to be removed. A drive sprocket 312 is operably coupled to the track frame 302. The drive sprocket 312 has a plurality of teeth 314 for engaging a track. The drive sprocket 312 is capable of selectively receiving power from a power source on a power machine and converting the received power into a rotational motion so that teeth on the sprocket engage and drive a track around the track frame 302.

A plurality of rollers 316 are rotatably coupled to the first portion 304 of the track frame 302 in fixed positions so that the second portion 306 of the track frame is capable of movement under influence of the tensioning member. The rollers 316 are individually identified in FIGS. 4-5 as 316-1, 316-2, 316-3, 316-4, and 316-5 for the purposes of identifying their relative positions, but can be collectively referred to using the reference 316. As is best seen in FIG. 5, each of the rollers 316, except for roller 316-1, has three circular elements or ribs, outer ribs 318 and an inner rib 320 of substantially identical diameters and attached to an axle 322, which in turn is attached to the first portion 304 of track frame 302. Each of the outer ribs 318, are capable of engaging the track to apply pressure to the track and distribute the weight of the machine onto the track. In some embodiments, the relationship between the rollers 316 and the track, center ribs 320 are capable of engaging the track, but in others, the center ribs are not capable of engaging the track. Roller 316-1, by contrast, only has outer ribs 318' attached to an axle 322', with no inner rib. This allows the rear idler 310 to be positioned within the diameter of the roller 316-1, advantageously allowing the roller 316-1 to be positioned as close as possible to the rear idler 310.

As shown in FIGS. 4-5, the spacing between the rollers 316 is not uniform. Generally speaking, rollers 316-2 and 316-3 are closer together than the spacing between any of the other rollers. Rubber tracks of the type that can be advantageously employed with track frames such as track frame 302 have metal reinforcing strips spaced periodically along the width of the track, the width of the track being defined as the direction between first and second sides 324, 328 of the track frame. The track can be the same width as the track frame 302, but in some embodiments the track width can be wider (or narrower) than the track frame. When rollers 316 are on these metal reinforcing strips, they ride slightly higher than when they are between the reinforcing strips. It has been found that arranging specific rollers to be on pitch with each other can influence the ability of the track frames to compensate for vibrations that might otherwise be introduced by the rollers 316 as they move over the track (or more accurately, as the track moves under the rollers). If two rollers 316 are on pitch, the rollers travel over reinforcing strips simultaneously. If two rollers 316 are off pitch, one of the rollers is travelling over a reinforcing strip while the other is not traveling over a reinforcing strip. The slight variation between on-pitch and off-pitch heights of the rollers introduces a vibration of the machine, especially as the rollers are closer to the center of gravity of the power machine that can cause the power machine to rock slightly fore and aft as the machine travels over the ground, especially if a resultant force from the rollers moves fore and aft of the center of gravity.

Figure 6:
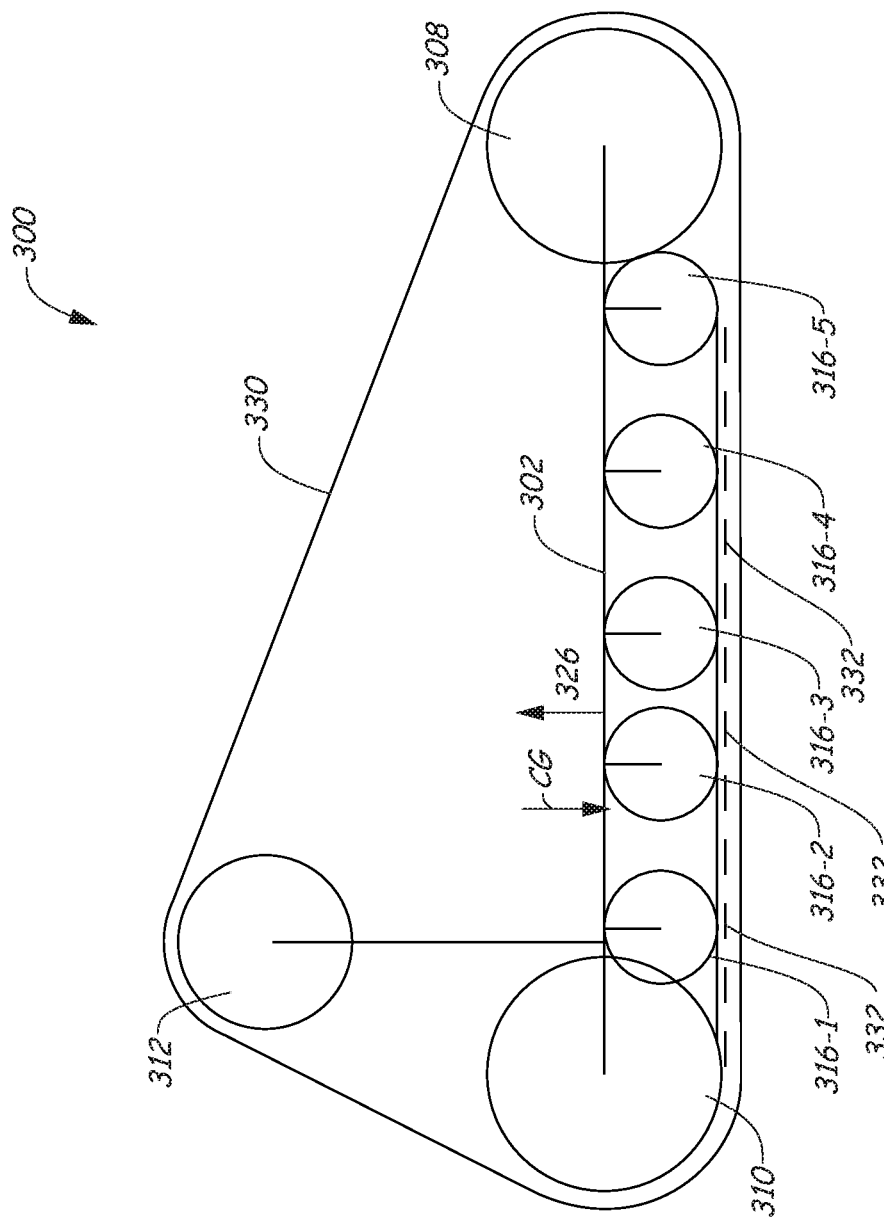
FIG. 6 is a diagram illustrating the relative placement of idlers and rollers on the track frame of FIG. 4 relative to the center of gravity of a power machine to which it is attachable.

FIG. 6 illustrates the relative position of elements of the track assembly 300 as attached to a power machine. The track assembly is positioned relative to the machine so that the roller 316-1 is fully behind the fore/aft center of gravity (identified as CG) of the machine. In addition, roller 316-2 at least partially positioned behind the CG of the machine. Rollers 316-2 and 316-3 are positioned so that they are in pitch with each other. Rollers 316-1 and 316-4 are positioned so that they are in pitch with each other, but out of pitch with rollers 316-2 and 316-3. With this arrangement, as track 330 travels under the rollers 316, the resultant force 326 remains in a relatively constant position and always either forward or, alternatively, rearward of (in other words, not oscillating between forward and rearward of) the CG. This position relative to the CG is discussed with reference to an unloaded machine. In some instances, a machine with a resultant force forward of the CG when unloaded may be rearward or aft of the CG when in a loaded condition because the CG of a front loaded machine may move forward when accounting for the load. For clarity's sake, any discussion in this application of a position of the resultant forces relative to the CG should be considered to be relative to the CG of an unloaded machine. The track 330 illustrates reinforcement members in the form of metal strips 332 embedded along the bottom thereof (it should be understood that understood that the members are embedded along the entirety of the track), showing rollers 316-1 and 316-4 being positioned over the reinforcement members and rollers 316-2 and 316-3 being positioned over spaces between the reinforcement members, illustrating the pitch relationship of these rollers. This arrangement improves the stability of the machine. Alternatively, when the rollers 316-2 and 316-3 being positioned over reinforcement members, rollers 316-1 and 316-4 are positioned over spaces between reinforcement members. Roller 316-5 can be in pitch with either of the pairs of 316-2 and 316-3 or 316-1 and 316-4. Because roller 316-5 is relatively far away from the CG, its impact on the system's performance is relatively negligible.

The arrangement shown in FIG. 6 accomplishes two important objectives: first, it allows for as much positioning of rollers behind the CG of the machine as is practicable. It should be noted that having the CG of the machine toward the rear of the machine is desirable because it increases the lift capacity of the machine. Thus, moving the CG forward is not a desirable option as a practical matter. Part of this is accomplished by allowing the rear idler 310 to move within the diameter of the roller 316-1. Second, the rollers are spaced apart in such a manner that rollers 316-2 and 316-3 are in pitch while rollers 316-1 and 316-4 are moved away from rollers 316-2 and 316-3 so that they are out of pitch with 316-2 and 316-3 but in pitch with each other to maintain a relatively constant position of the resultant force 326.

The embodiments above provide several advantages. In particular, the position of the rollers are such that vibrations caused by driving over various support surfaces are minimized due to the placement of rollers relative to the rear idler and the center of gravity of the power machine. The inventive placement of these rollers result in an improved experience for an operator, allowing the operator to control the power machine more easily and without experiencing as much fatigue as would otherwise be experienced.

Although the subject matter has been described in language specific to structural features and/or methodological acts, it is to be understood that the subject matter defined in the appended claims is not necessarily limited to the specific features or acts described above.

What is claimed is:

1. A track assembly for a power machine, comprising:
a track frame having a main portion and a secondary portion that is moveable with respect to the main portion;
a track carried on the track frame and capable of being driven around the frame;
a first idler rotatably mounted to the main portion of the track frame and positioned to engage the track and rotate as the track is driven about the first idler;
a second idler rotatably mounted to the secondary portion track portion and positioned to engage the track and rotate as the track is driven about the second idler; and
a plurality of rollers rotatably mounted to the main portion of the track frame and wherein a first of the plurality of the rollers is positioned close enough to the second idler so that the second idler extends into a cylinder defined by a perimeter of the first roller, and wherein a second of the plurality of rollers has a plurality of outer ribs and at least one inner rib, with each of the inner and outer ribs being capable of engaging the track as it is driven about the track frame.

2. The track assembly of claim 1 wherein the first roller has a pair of outer ribs and a space between the outer ribs into which the second idler can extend.

3. The track assembly of claim 1 wherein the track includes a plurality of evenly spaced reinforcement members embedded from one edge of the track to the other, and wherein the plurality of rollers includes second, third, and fourth rollers positioned in a line along the main portion of the track frame, and wherein the second and third rollers are positioned so that the third roller is positioned directly over one of the reinforcement members when the second roller is positioned over one of the reinforcement members.

4. The track assembly of claim 3, wherein the first roller is positioned over a space between two of the reinforcement members when the second roller is positioned over one of the reinforcement members.

5. The track assembly of claim 4, wherein the fourth roller is positioned over a space between two of the reinforcement members when the second roller is positioned over one of the reinforcement members.

6. The track assembly of claim 1 and further comprising:
a drive sprocket capable of engaging and driving the track around the track frame, and wherein the drive sprocket is positioned so that a center of the drive sprocket is positioned rearward of center of each of the plurality of rollers.

7. A track assembly for a power machine, comprising:
a track frame having a main portion and a secondary portion that is moveable with respect to the main portion;
a track carried on the track frame and capable of being driven around the frame, wherein the track includes a plurality of evenly spaced reinforcement members embedded from one edge of the track to the other;

a first idler rotatably mounted to the main portion of the track frame and positioned to engage the track and rotate as the track is driven about the first idler;

a second idler rotatably mounted to the secondary portion track portion and positioned to engage the track and rotate as the track is driven about the second idler; and a plurality of rollers rotatably mounted to the main portion of the track frame and wherein the plurality of rollers includes first, second and third rollers positioned in a line along the main portion of the track frame, and wherein the first and second rollers are positioned so that the second roller is positioned directly over one of the reinforcement members when the first roller is positioned over one of the reinforcement members.

8. A track assembly for a power machine, comprising:

a track frame having a main portion and a secondary portion that is moveable with respect to the main portion;

a track carried on the track frame and capable of being driven around the frame, wherein the track includes a plurality of evenly spaced reinforcement members embedded from one edge of the track to the other;

a first idler rotatably mounted to the main portion of the track frame and positioned to engage the track and rotate as the track is driven about the first idler;

a second idler rotatably mounted to the secondary portion track portion and positioned to engage the track and rotate as the track is driven about the second idler; and a plurality of rollers rotatably mounted to the main portion of the track frame and wherein a first of the plurality of the rollers is positioned close enough to the second idler so that the second idler extends into a cylinder defined by a perimeter of the first roller, wherein the plurality of rollers includes second, third, and fourth rollers positioned in a line along the main portion of the track frame, and wherein the second and third rollers are positioned so that the third roller is positioned directly over one of the reinforcement members when the second roller is positioned over one of the reinforcement members.

9. The track assembly of claim 8, wherein the first roller is positioned over a space between two of the reinforcement members when the second roller is positioned over one of the reinforcement members.

10. The track assembly of claim 9, wherein the fourth roller is positioned over a space between two of the reinforcement members when the second roller is positioned over one of the reinforcement members.

* * * * *